US011170101B2

(12) United States Patent
Lew et al.

(10) Patent No.: US 11,170,101 B2
(45) Date of Patent: Nov. 9, 2021

(54) OBSERVATION AND CLASSIFICATION OF DEVICE EVENTS

(71) Applicant: Avast Software s.r.o., Prague (CZ)

(72) Inventors: Hiram Lew, San Francisco, CA (US); Filip Havlíček, Horoušany (CZ); Pablo Sole, Woodside, CA (US); Tomáš Pop, Prague (CZ)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/694,123

(22) Filed: Nov. 25, 2019

(65) Prior Publication Data

US 2020/0089875 A1    Mar. 19, 2020

Related U.S. Application Data

(63) Continuation of application No. 16/141,268, filed on Sep. 25, 2018, now abandoned.

(Continued)

(51) Int. Cl.
G06F 21/55    (2013.01)
G06F 21/56    (2013.01)
G06F 9/54    (2006.01)

(52) U.S. Cl.
CPC ............ G06F 21/552 (2013.01); G06F 9/545 (2013.01); G06F 21/554 (2013.01); G06F 21/566 (2013.01); G06F 2221/033 (2013.01)

(58) Field of Classification Search
CPC .......... G06F 12/14; G06F 21/55; G06F 21/56; G06F 9/54; G06F 21/552; G06F 21/566; G06F 21/554; G06F 9/545
See application file for complete search history.

(56) References Cited

U.S. PATENT DOCUMENTS 6,442,611 B1    8/2002    Navarre et al.
6,832,260 B2 *  12/2004   Brabson .................. G06F 9/544
                                                    709/230

(Continued)

FOREIGN PATENT DOCUMENTS

CN    103198255 A    7/2013
KR    1020170055962 A    5/2017

OTHER PUBLICATIONS

Artenstein et al., Man in the Binder: He Who Controls IPC, Controls the Droid, Sep. 29, 2014, pp. 1-23, Malware Research Lab, Check Point.

Primary Examiner — Thanhnga B Truong
(74) Attorney, Agent, or Firm — Erickson Kernell IP, LLC; William B. Kircher

(57) ABSTRACT

Systems and methods observe and classify device events. A model containing a set of features to be observed can be determined based on machine learning and training methods. A client application can issue a transaction request to an operating system service. A determination can be made whether the operating system service, a method associated with the transaction request, and the client application are currently being observed. In response to determining that the operating system service, a method associated with the transaction request, and the client application are being observed, a behavioral vector associated with the client application can be modified to indicate that the feature represented by the method is associated with the client application. The behavioral vector can be used to determine if the client application is malware.

20 Claims, 7 Drawing Sheets

Related U.S. Application Data

(60) Provisional application No. 62/565,917, filed on Sep. 29, 2017.

(56) References Cited

U.S. PATENT DOCUMENTS

| | | |
|---|---|---|
| 9,071,636 B2 | 6/2015 | Raman et al. |
| 9,202,047 B2 | 12/2015 | Gupta et al. |
| 9,349,001 B2 | 5/2016 | Gathala et al. |
| 2009/0248494 A1* | 10/2009 | Hueter .................. H04L 51/12 705/7.29 |
| 2014/0201807 A1* | 7/2014 | White .................. G06F 21/577 726/1 |
| 2014/0316984 A1 | 10/2014 | Schwartz |
| 2016/0029221 A1 | 1/2016 | Suarez Garcia et al. |

* cited by examiner

OBSERVATION AND CLASSIFICATION OF DEVICE EVENTS

CROSS-REFERENCE TO RELATED APPLICATIONS

This application is a Continuation of and claims priority to U.S. patent application Ser. No. 16/141,268, filed on Sep. 25, 2018, entitled "OBSERVATION AND CLASSIFICATION OF DEVICE EVENTS," currently pending, the entire disclosure of which is incorporated herein by reference, which claims priority to U.S. Provisional Application Ser. No. 62/565,917, filed on Sep. 29, 2017, entitled "OBSERVATION AND CLASSIFICATION OF DEVICE EVENTS," the entire disclosure of which is incorporated herein by reference.

FIELD

The disclosure relates generally to systems and methods for device security, and more particularly, to observing and classifying device events.

BACKGROUND

Over time, smart phones have become more capable and their use has increased. However, as a result of this increasing use, smart phones have become a more attractive target for malware. Malware, short for "malicious software," is software that can be used to disrupt device operations, damage data, gather sensitive information, or gain access to private computer systems without the user's knowledge or consent. Examples of such malware include software viruses, trojan horses, rootkits, ransomware etc. Correctly identifying which files or applications that contain malware and which are benign can be a difficult task, because malware developers often obfuscate various attributes of the malware in an attempt to avoid detection by anti-malware software.

BRIEF DESCRIPTION OF THE DRAWINGS

For a better understanding of the inventive subject matter, reference may be made to the accompanying drawings in which.

DETAILED DESCRIPTION

Figure 1:
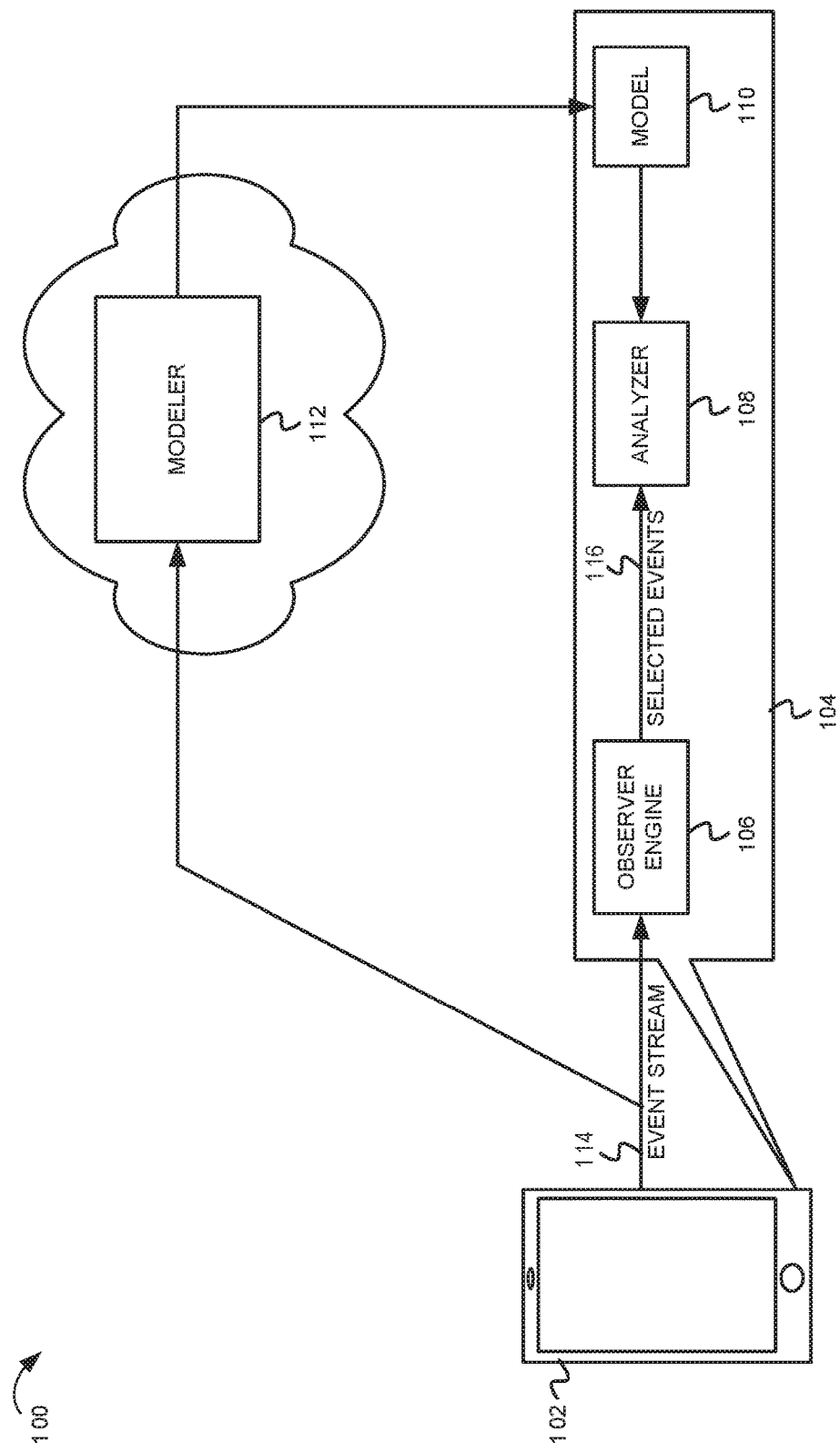
FIG. 1 is a block diagram illustrating data flow between components of a system for observing and classifying device events according to embodiments.

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Various techniques are used in practice for malware detection on mobile devices such as smart phones. One such technique, behavioral analysis, uses observation of process behavior to heuristically detect malicious intent. In practice, the design of the malware detection system should probe the system at specific locations of interest and compare the behavior against the behavior of known malware. The malware detection system performs the detection in two steps. During the first step, an observation is performed to collect events of interest. During the second step, the events of interest in aggregate are filtered and classified. A behavioral vector results from the classification of the aggregated events which can be further processed into a heuristic, or confidence level. The confidence level can be compared against an objective metric to determine of whether or not the observation is malicious behavior. Observed malicious behavior can be correlated with the target application to determine whether an application is malicious or benign, malicious, or undetermined.

Definitions

As used herein, a hook is defined as a small piece of code used to gather information on a "feature" usage inside a system. Information obtained by the hook during program execution can provide data on the feature. When executed on a machine processor, a hook can redirect program execution to a set of instructions written to perform analysis.

As used herein, a behavioral feature is defined as a module or line of code which will generate an event of interest during program runtime. By adding one or more "hooks" in a system of interest at the locations of interest, an observer will generate an aggregate of feature events as necessary to generate a behavioral vector.

As used herein, a behavioral vector is defined as a set of behavior features which define the behavior of interest. The machine learning model can transform the behavioral vector using any linear or non-linear methods to produce a result. The result is used as a heuristic for malware detection.

FIG. 1 is a block diagram illustrating data flow between components of a system 100 for observing and classifying device events according to embodiments. In some embodiments, system 100 includes a computing device 102 having an analysis software environment 104 that includes an observer engine 106, an analyzer 108, and a model 110. System 100 can further include a modeler 112 that can be based on the computing device 102, or can be external to computing device 102 as shown in FIG. 1.

Computing device 102 can be any type of smart phone. However, the inventive subject matter is not limited to smart phones, and in alternative embodiments, computing device 102 can be a tablet computer, a media player (e.g., MP3 player), a laptop computer, a desktop computer etc. In some embodiments, computing device 102 executes the Android operating system. In alternative embodiments, the computing device 102 executes a version of the Linux operating system. In further alternative embodiments, the computing device can execute a version of the iOS operating system.

Observer engine 106 can acquire and process feature usage for an application or service running on a computing device 102. The observer engine 106 can maintain a behavioral vector for each application, and can update the behavioral vector as feature usages by an application are detected.

Model 110 can include data defining the features of interest. In some embodiments, model 110 can be a binary blob that includes an evaluation model and the list of features of interest. The evaluation model can be a program that receives as input a per-application behavioral vector, and returns a confidence value. In some embodiments, the list of behavioral features describes instrumentation points into the system services, the data type of the feature, and the feature's position inside of the behavioral vector.

Analyzer 108 can be a service that can receive a model 110, evaluate a model 110, and notify interested parties of the evaluation result. In some embodiments, analyzer 108 can receive a model 110, unpack a binary blob received from a higher-level service and split the model into two parts, the evaluation program and the list of features of interest. Evaluating a model means to run the evaluation program against the per-application behavioral vector to determine a confidence value. In some embodiments, notifying interested parties can include providing an interface either through the use of a poll/read mechanism or broadcast or callback method to alert a mobile application that an event has occurred, namely that an application is malware.

The modeler 112 can include machine-learning techniques, calculations, and computational methods used to generate a model 110. The modeler 112 is an abstraction for a machine learning process used to determine which feature set (out of tens of thousands of features) to use and the computational method (e.g. logistic regression, random forest) to program in the evaluation model. Various processes can run on an emulator farm to train the model. The modeler can receive event data from these processes as part of the supervised learning process and uses the data to train the model.

During operation, applications and services executing on computing device 102 can generate many events. These events can be captured and placed into an event stream 114 that is provided to observer engine 106 and modeler 112. In some embodiments, these events comprise inter-process communication events that occur between an application and a service. Observer engine 106 can provide selected events 116 to analyzer 108. The events can be selected based on features of interest, and such features of interest can be dynamically updated.

Further details on the various components of the above described system are provided below with respect to FIG. 2.

Figure 2:
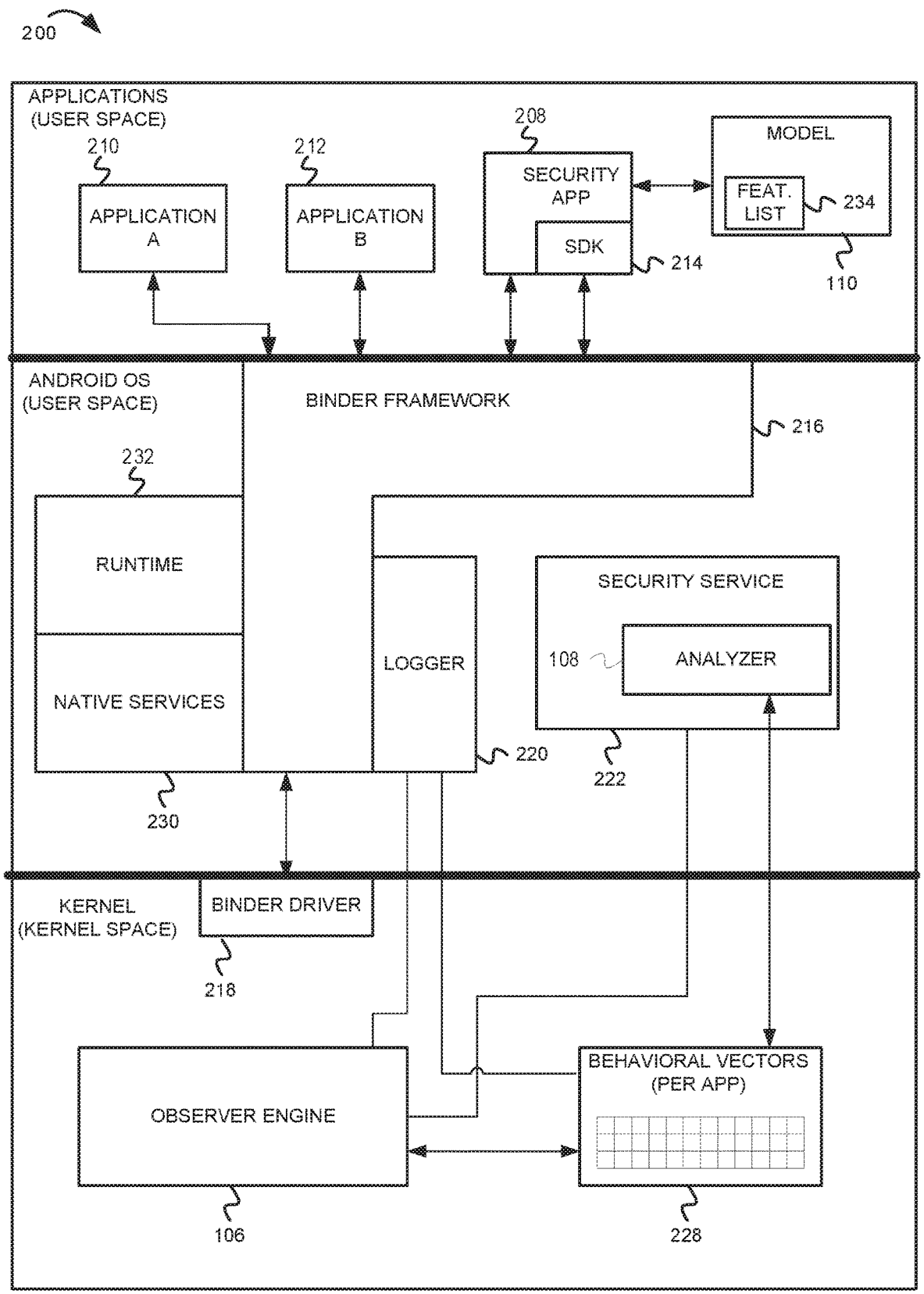
FIG. 2 is a block diagram illustrating a software environment for observing and classifying device events according to embodiments.

FIG. 2 is a block diagram illustrating a software environment 200 for observing and classifying device events according to embodiments. In some embodiments, software environment 200 runs in an Android operating system environment. The architecture sandboxes client applications and system applications in user-space memory. Communications between applications and services can be facilitated through IPC (Inter-Process Communication), message passing, shared memory, or other communication facility.

In some embodiments, client applications 210 and 212 communicate with services (e.g., native services 230) using messages sent via an IPC mechanism referred to as "binder." The binder IPC mechanism is provided on Android and other Linux based operating systems. Binder can include a binder driver 218 that resides in the kernel space, and a binder framework 216 that resides in user space. The binder framework 216 can be considered "glue" code running in the user-space to facilitate communication with the kernel driver by an application (210 and/or 212) and service 230. Binder generally refers to both the kernel driver implementation (e.g., binder driver 218) and the user-space binder framework 216 together.

Binder can provide extensive insight into the runtime behavior of an Android device at varying discrete levels of coarseness. A binder transaction can provide an information-dense view of the communication chain between two Android processes. For each transaction, the communication protocol includes both meta-data about the sender and receiver along with flattened data from objects called parcels. A parcel is thus a container for the data that is the subject of the transaction. Observations performed on the binder transaction can provide high visibility into the inter-process interaction because system calls are typically made through the client-server message passing mechanism which is part of the binder design. For a specific application (210 and/or 212), aggregating the binder calls of that application can be used to profile the application and determine its behavior.

In some embodiments, logger 220, analyzer 108, and observer engine 106 operate to observe and analyze binder calls to create behavioral vectors 228 that can be used to analyze an application's behavior and determine if the application is malicious (i.e., contains malware). Each behavioral vector represents the observed model-specific features for an application. The behavioral vector serves as a storage location for observed events. In some embodiments, each behavioral vector can be a list of counters, where a counter can be associated with each feature in the model, and where the counter increments if an event involving a feature is observed. In other words, if the method is called for a specific service, and the method is deemed "interesting", meaning to say that the method is a feature included in the model, then the counter for that feature will increment given that the observer engine 106 is executing and enabled. In alternative embodiments, the behavioral vector can include a sliding window of event transactions that are observed in addition to, or instead of counters.

Logger 220 can be a set of "hooks" (small pieces of code used to gather feature usage inside the system). The hooks can be distributed around various components of the Android OS as desired to observe requested features. For example, hooks can be distributed to monitor aspects of the Android runtime 232 and/or native services 230 provided by the Android OS. In some embodiments, the hooks correspond to API calls that can also be found in the binder framework 216. Thus, the logger 220 doesn't need to reside in the kernel space itself. In alternative embodiments, the hooks can span across both user space and the kernel as some of the potentially observed features can be in the kernel only. Changes in the feature usage as determined by the various hooks can be delivered to the observer engine 106 for further processing. The feature usage can be later used to distinguish between malicious and clean applications.

Observer engine 106 can acquire and process feature usage information. As described above, since at least some of the hooks of the logger 220 can potentially reside in kernel space, in some embodiments, the observer engine 106 resides in the kernel space as well to ensure the performance impact of passing the observed features on the overall system is negligible. The observed features as reported by hooks of logger 220 can be processed and it can be determined by observer engine 106 if changes are made to the behavioral vectors 228 of the respective applications. The behavioral vectors 228 can be stored in a preallocated memory structure. In response to any change to the behavioral vectors 228, a security service 222 can be notified and the changed behavioral vectors can be delivered to an analyzer 108 component of the security service 222. The observer engine 106 can also react to changes in the observed features as requested by the analyzer 108 as will be further described below.

In some embodiments, an observation of an application is performed for a predetermined or configurable threshold amount of time and/or number of events on the first launch of an application, with the expectation of generating a behavioral vector which can be analyzed. In such embodiments, the analysis is not performed and the application is not classified unless the desired threshold of time or events is met.

Security service 222 can be a "connecting" module between observer engine 106 and Software Development Kit (SDK) 214. In some embodiments, security service 222 can include analyzer 108 as a submodule that classifies behavior of applications. In alternative embodiments, analyzer 108 can be separate from security service 222. Security service 222 can receive behavioral vectors from the observer engine 106 and pass them to the analyzer 108. Results from the analyzer 108 can then, if needed, be propagated to the SDK 214. The security service 222 can also handle updates of the model 110 in the analyzer 108. For example, in some embodiments, a model 110 can be passed to the security service 222 via the SDK 214. The security service 222 can then verify the model 110 and update the model in the analyzer 108. Security service 222 can also inform the respective modules in the stack (i.e., logger 220, observer engine 106 etc.) about the features to be observed requested by the current model 110. Further details on the workflow of the model updates are provided below.

SDK 214 can be a front end interface for a security application 208 (i.e., an anti-virus or other anti-malware application) to interact with the system. The SDK 214 can include Application Program Interfaces (APIs) for authenticating an application (e.g., applications 210 and/or 212). SDK 214 can also include APIs for controlling the behavior of the system as a whole and updating the model 110. The SDK 214 can propagate results of the classification done in the analyzer 108 to the security application 208 so that it can react accordingly to events that are currently happening on the device. SDK 214 can be provided in binary form with appropriate documentation to security application developers. Additionally, in some embodiments, the API for SDK 214 can include methods to enable/disable monitoring for an application, quarantine an application, and/or disable an application package.

The above-described components and APIs can be used in various workflows. Such workflows can include updating a model 110, vectorizing a behavioral observation, evaluating a model 110 on a package/application vector, and notifying a security application 208 regarding an application.

Pushing/Updating a Model into the Analyzer

A security application 208 can initiate this flow by issuing a call to a method in SDK 214 to push or update a model to the system. In some embodiments, this causes the model 110 to be sent to the security service 222 via a binder IPC. The security service 222 can verify the signature of the model 110, unpack it and split it into its component parts: the evaluation model itself and a list of behavioral features to observe. The evaluation model 110 can be a program that receives as input a per-application behavioral vector, and returns a confidence value. This value is later sent as an event to the security application 208 (see 'Notifying a Security Application" flow below). The list of behavioral features describes the instrumentation points into the system services (e.g., native service 230 and runtime 232), the data type of the feature, and its position inside of the behavioral vector. In some embodiments, each feature is uniquely identified from the corresponding service's "binder interface" (also known as an Android Interface Definition Language (AIDL) file if automatically generated) with an opcode. These opcodes are defined before or during compilation of the "binder interface". The opcode and service pair can uniquely identify the feature.

Once the security service 222 has unpacked the model 110, the security service 222 can notify system services that a new model 110 is available, to which a thread (e.g., updater thread 408, FIG. 4) running on each service can respond by reading the new features list and applying the instrumentation points if needed. This mechanism works the same whether it is a first initialization or a later update of the model 110. In some embodiments, when a new model 110 is pushed, the per-application behavioral vectors can be reset.

Vectorizing a Behavioral Observation

This workflow is processed when a method call to a system service is deemed of interest, i.e., the feature is in the model-specific instrumentation list. Several checks can be performed to decide if the behavior needs to be accounted for. These checks can be performed in an order that rules out the most common cases first and gets the behavioral code out of the way to make the IPC call as fast as possible. This is desirable, because it can minimize the overhead imposed by the observer engine 106.

In some embodiments, the system checks to determine if the system service is being instrumented. The system can then check to confirm that the specific method being intercepted needs to be counted. The system can further check to confirm that the caller is an application that is under active evaluation (i.e., it has not been disabled). In alternative embodiments, the system can extend each to check to further include conditions as determined by feature list 234. Such conditions could be, for example, if the application calling this binder method is the current Foreground application, or if some other feature has been detected before (what is usually known as quadratic or, more generally, non-linear event chain). As noted above, the order of these checks can vary depending how each individual check affects the overhead of monitoring the IPC transaction.

Once these checks have passed, the system can modify the per-application behavioral vector in the model 110. In some embodiments, the system can set a flag that the analyzer 108 can use to decide which applications need to be evaluated again.

Evaluating a Model on a Package Vector

In some embodiments, security service 222 can wait for notifications of new behavioral information. Whenever security service 222 determines that a behavioral vector for an application has changed, it can evaluate the model 110 using this changed behavioral vector as an input parameter. Models 110 can include evaluation models that are compiled as small executable programs to reduce any overhead during the evaluation. In some embodiments, the security service 222 can have direct access to the map of behavioral vectors 228 to avoid the need to request or copy the vector's buffer. These two design decisions, compiled models and zero-copy semantics, can make the whole model evaluation more efficient when compared to typical systems.

Notifying a Security Application

When an evaluation model returns a confidence value above a configurable threshold, an event including relevant information about the package involved can be created and sent to the security application 208 (e.g., using a binder IPC call). The receiver of this callback can make a final determination as to how to react to this potential threat. Multiple events might be created related to a same application. A security application 208 can perform any of several actions when an event is received. For example, the security application 208 can use the APIs provided by the SDK 214 to quarantine an app, disable the monitoring for the app if it is considered a false positive, or just do nothing and keep collecting behavioral information if the confidence is not high enough yet. Additionally, in some embodiments, the security application can upload the event data to modeler 112 in order to improve the model 110 training.

It should be noted that although FIG. 2 has been discussed in the context of the Android OS and binder, the embodiments are not so limited. For example, the IPC framework in iOS is known as XPC. Similar in function to binder, XPC provides a client-service remote procedure call mechanism which relays calls between clients and services. XPC is also similar to binder in that parcels are containers that can include flattened objects, XPC flattens objects into serialized property lists. Thus, the iOS XPC can be considered the iOS equivalent to binder in Android. As a result, one of ordinary skill in the art having the benefit of the disclosure will appreciate that the aspects of the inventive subject matter described herein can be applied to iOS and XPC.

Further, it should be noted that FIG. 2 illustrates embodiments in which the observer engine 106 executes in kernel space, and the behavioral vectors are stored in kernel space. In these embodiments, observer engine 106 can be implemented as a device, and UNIX ioctl calls can be used to communicate with the observer engine 106. In alternative embodiments, either or both observer engine 106 and behavioral vectors 228 can reside in user space as part of the Android OS. In these embodiments, observer engine 106 can be implemented as an OS daemon and accessed through UNIX sockets or other IPC mechanisms.

Figure 3:
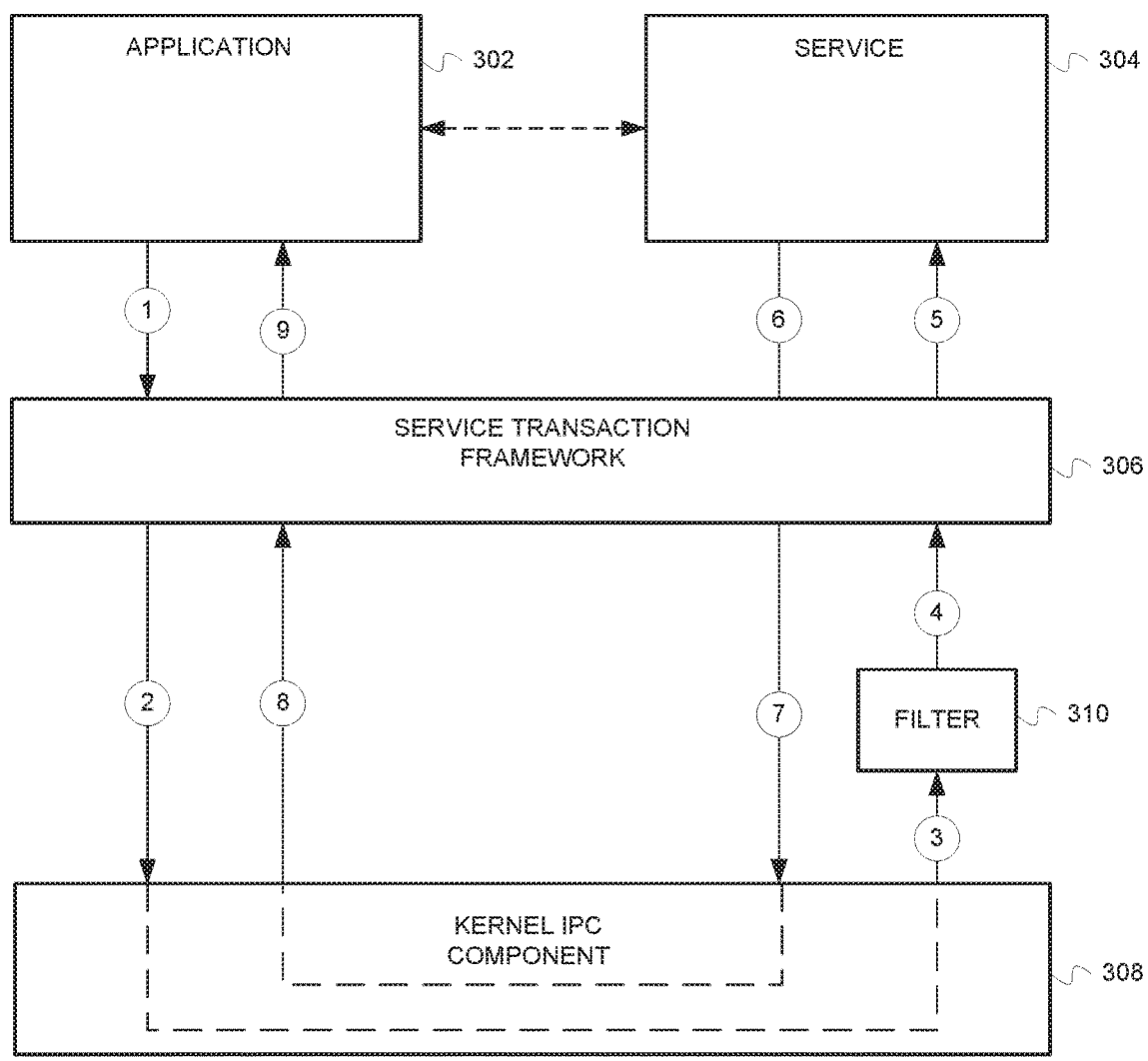
FIG. 3 is a block diagram illustrating an event flow between an application and a service in a system for observing and classifying device events according to embodiments.

FIG. 3 is a block diagram illustrating an event flow between an application 302 and a service 304 in a system for observing and classifying device events according to embodiments. An application 302 can initiate a request for a service provided by service 304. The request can be provided to a service transaction framework 306 via communication 1. In some embodiments, service transaction framework 306 can be the Android binder framework. In alternative embodiments, service transaction framework 306 can be iOS XPC. Interfaces between application 302 and service transaction framework 306 can perform marshalling and serialization of data so that the data in communication 1 is in a format expected by the service transaction framework 306.

The service transaction framework 306 can forward the request to kernel IPC component 308 via communication 2. In some embodiments, kernel IPC component 308 can be a binder driver, and communication 2 can be performed using an ioctl system call to the driver. Service transaction framework 306 can perform any required marshalling and serialization of the data so that the data is in a format expected by kernel IPC component 308.

A dispatcher (not shown) in kernel IPC component 308 forwards the request to filter 310 via communication 3. The request is in a format expected by the service transaction framework 306. In some aspects, filter 310 can be a modified version of the Binder call IPCThreadState:executeCommand( ). Filter 310 can receive communication 3 and check for the existence of a hooks table by testing a pointer to the hooks table. If the pointer exists, a hooks table was loaded as part of a previous transaction request, and the filter can access the table. The hooks table comprises a table of hooks that correspond to the features to be observed as specified in the features list. In some embodiments, the filter 310 can be part of a modified binder framework that replaces the standard binder version of the framework. In alternative embodiments, filter 310 can be part of a modified XPC framework. In addition to filter 310, the modified framework can include modifications to perform "hooking" and to run the analyzer 108.

Filter 310 can check if the transaction code to transact provided in the request is inside the boundaries of the hooks table. In some embodiments, the transaction code comprises the "numeric transaction code" represented by the opcode from the RPC interface known as AIDL. Each opcode uniquely defines a single callable method from the service. If the code is found in the hooks table, the transaction request (e.g., a binder or XPC call) can be logged. In other words, if the opcode index is set, then the opcode is hooked.

Because the code for hooking is on the request path, it is desirable for the program to resume its normal operation as quickly as possible. Thus in some embodiments, provisions to remove processing overhead are made using pre-computation techniques. Additionally, in some embodiments, no memory allocation, searching, or hashing is performed during the hook.

Filter 310 forwards the request to service transaction framework 306 via communication 4. Service transaction framework 306 then forwards the request to service 304 via communication 5.

Service 304 can process the request, and the results of the request can be returned to the application 302 through service transaction framework 306 and kernel IPC component 308 via communications 6-9.

Placing the filter 310 between a dispatcher in kernel IPC component 308 and the service transaction framework 306 can be desirable as it can ensure that all transaction requests will pass through filter 310 and that all transaction requests that are in the model's feature list can be observed. At the filtration point, the classification filter 310 can follow rules to ignore transaction requests which represent caller functions which are not in the feature list.

Figure 4:
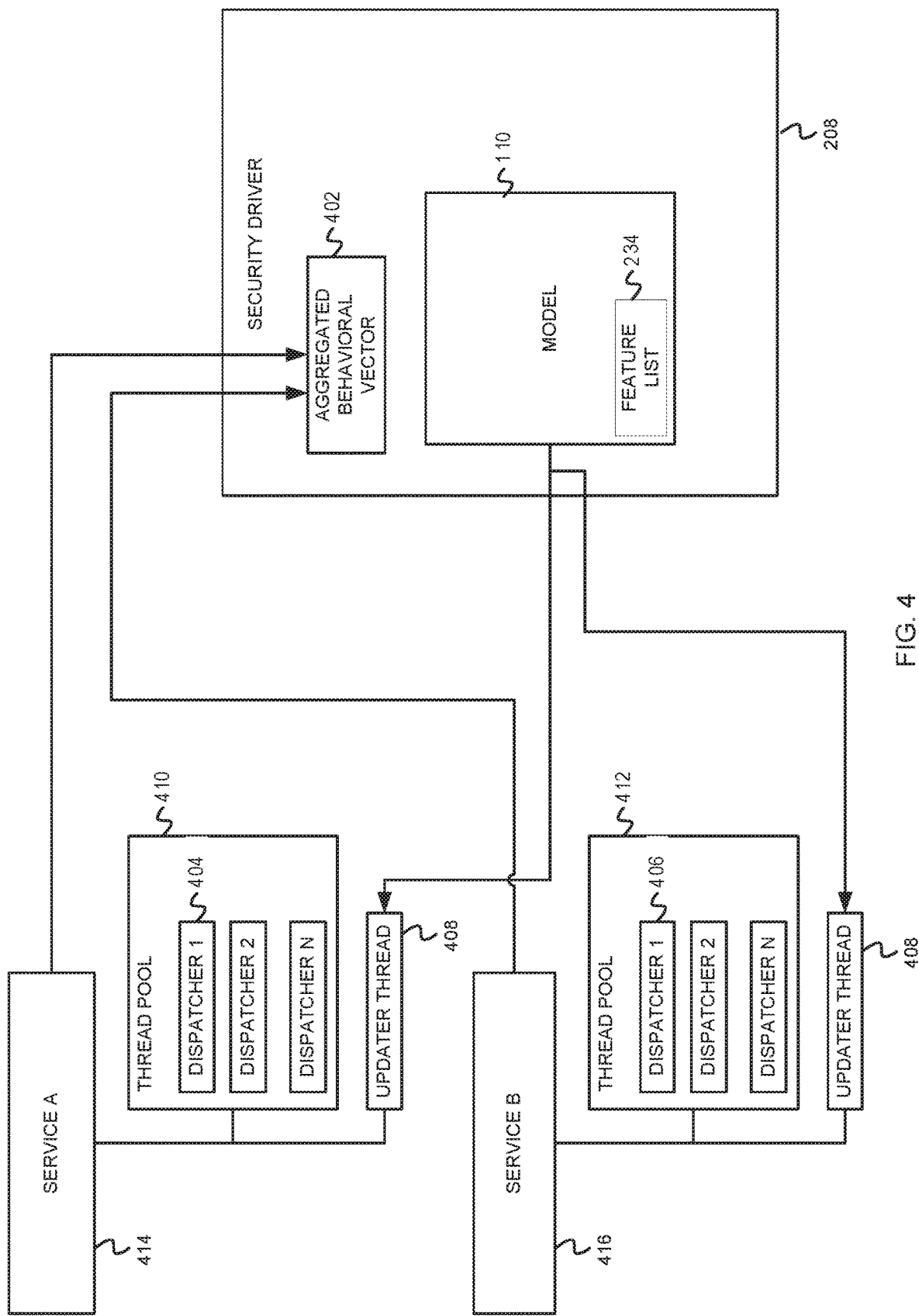
FIG. 4 is a block diagram illustrating components of a software environment for updating a dynamic model in a system of observing and classifying device events according to embodiments.

FIG. 4 is a block diagram illustrating components for updating a dynamic model in a system of observing and classifying device events according to embodiments. In the example illustrated in FIG. 4, two services, service A 414 and service B 416 provide services to applications running on a computing device. Service A 414 and service B 416 can have respective thread pools (410, 412) that comprise groups of available dispatcher threads (404, 406) that perform functions provided by their respective services.

In some embodiments, the composition of the aggregated behavioral vector 402 can be modified by loading a feature list 234 during runtime of a service (e.g., service A 414, service B 416). In some aspects, the aggregated behavioral vector 402 comprises an aggregate of all behavioral vectors for each application, stored in a contiguous memory location as initialized by the observer engine 106. The feature list 234 can be stored and updated from a binary section of the machine-learning model 110 to be loaded on device boot or to be updated during runtime. The feature list 234 can be dynamically loaded into the filter 310 (FIG. 3) and used to observe transactions between applications and service (e.g., binder or XPC transactions). Hooking may only be performed for transaction requests that match the filter rules. Instead of placing static hooks in the system in the code-path between the client and the server—namely at the client-side function call as in previous approaches, a targeted filtration point is chosen on the receiving end at the IPC dispatcher on the service end. Prior to dispatch and after receiving the IPC call from the kernel IPC component 308 (FIG. 3), the filter 310 tests whether or not to hook the call. If the filter determines that the call is to be hooked, the hook sets the flag in the behavioral vector 402 to signal that a feature has been observed.

Updater thread 408 waits on a flag to change and if so updates the table of hooks from the observer engine 106. When an updated model 110 is loaded into the security driver 208, a flag can be set that instructs the thread to dereference the old hooks table and reference the new hooks table. In some embodiments, futex (fast user space mutex) calls are used to cause the updater thread 408 to be taken out of the scheduling loop until such a change occurs. That is, the updater thread 408 won't typically waste any CPU cycles.

Figure 5:
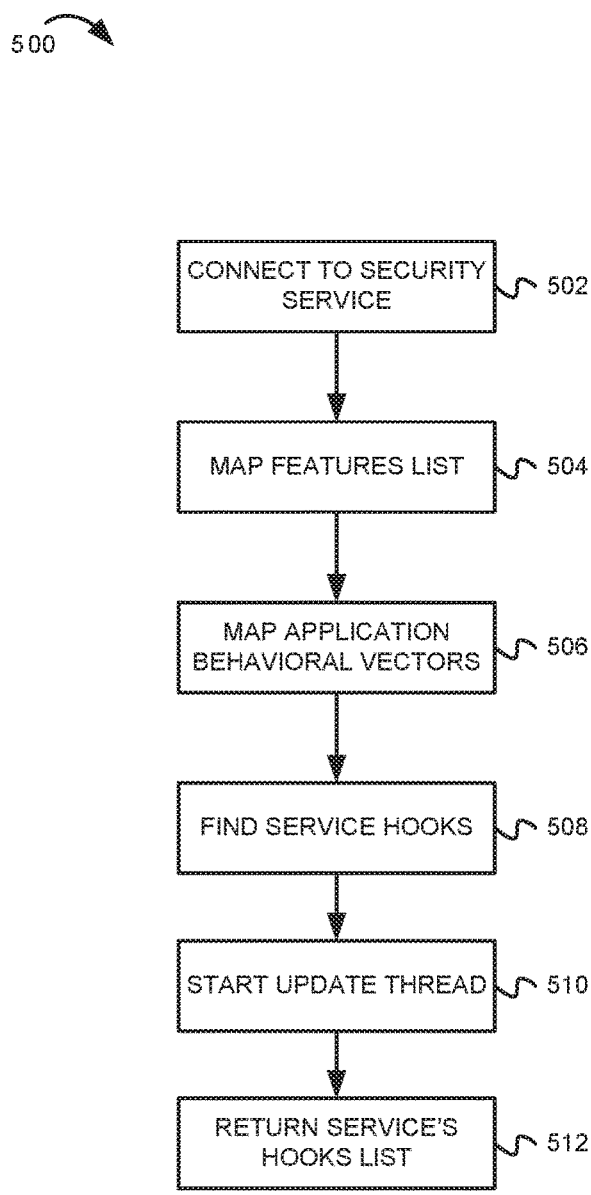
FIG. 5 is a flow chart illustrating a method for initializing observation and classification of device events according to embodiments.

FIG. 5 is a flow chart 500 illustrating a method for initializing observation and classification of device events according to embodiments. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 5 is inclusive of acts that may be taken by an operating environment executing an example embodiment of the invention.

In some embodiments, the method illustrated in FIG. 5 is executed by a service when a first binder transaction is received for the service. For example, the method of FIG. 5 can be executed in the Binder class constructor.

At block 502, a service connects to a security driver 208. In some embodiments, the service connects to a security driver when a new binder service object is created in the service.

At block 504, the service maps a features (i.e., hooks) list. In some embodiments, a service accesses the binder driver on initialization to map a shared memory buffer where the features list is stored. The memory mapping of the shared memory buffer during initialization allows the service to reference the feature list without any copy semantics and allows the service to create the reference only once during service initialization. The reference to the features list is recreated by the updater thread (FIG. 4, 408) when a new model is loaded.

At block 506, the service maps application behavioral vectors. As noted above, the application "behavior" is tracked in a behavioral vector. In some embodiments, a dispatcher thread (FIGS. 4, 404 and 406) in the service of interest performs the behavioral vector modification. In such embodiments, the service's dispatcher thread (FIG. 4, 404 and 406), or more generically, the service, has a reference to the storage location where the "behavior" of all applications are tracked (e.g., behavioral vectors 228. In some embodiments, the storage location is a shared-memory mapping initialized by the kernel and referenced by the service through an ioctl call. In some embodiments, the storage location can be a contiguous block of memory apportioned with a fixed size per application. The offset for each application can be a multiple of the application's UID.

At block 508 the service determines the hooks for the service. In some embodiments, hooks are specific to a service. The feature list can be a list of method calls from all services that are relevant to the machine learning model 110. Each service's binder interface definition can include a list of opcodes, each opcode corresponding to a callable method. The service maps into memory a table (or array) of which opcodes for the current service are currently enabled for observation by setting one or multiple bits corresponding to the location in the array representing the opcode. In other words, a flag is set for each opcode to log and unset for each opcode to ignore. The result of the mapping comprises a hooks table.

The service can determine the hooks (or hooked opcodes) by comparing the available opcodes for the current service with the service/opcode list in the feature list. Opcodes which match the current service are flagged in the hooks table.

At block 510, the service spawns a thread (e.g., updater thread 408, FIG. 4) whose purpose is to wait on a flag to change and if so update the table of hooks from the driver. When an updated model 110 is loaded into the security driver 208, a flag can be set that instructs the thread to dereference the old hooks table and reference the new hooks table. As noted above, in some embodiments, futex calls can be used to cause the updater thread 408 to be taken out of the scheduling loop until such a change occurs. In some embodiments, the updater thread 408 is started per each process of the service, not per service.

Figure 6:
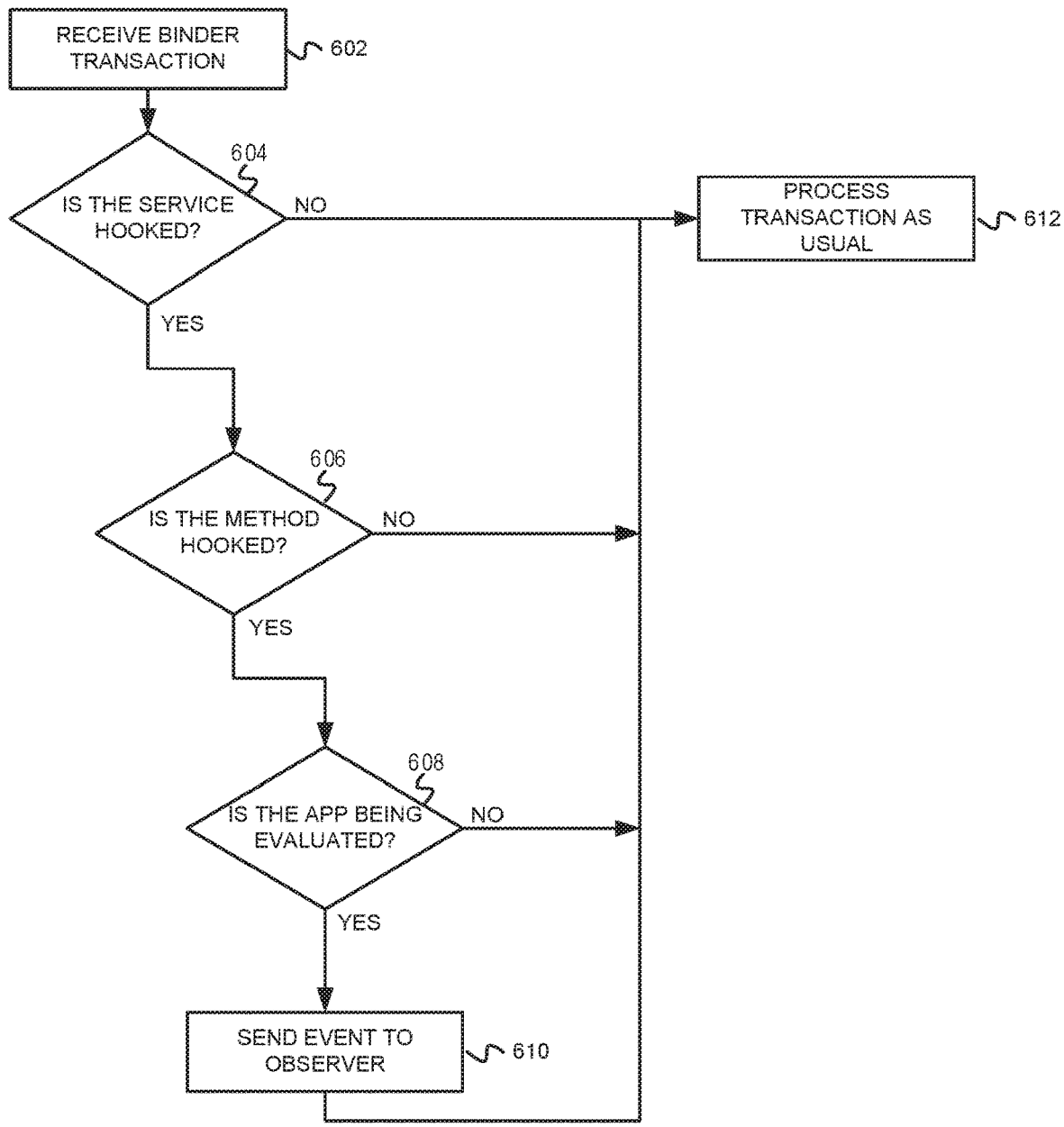
FIG. 6 is a flow chart illustrating a method for filtering observed and classified device events according to embodiments.

FIG. 6 is a flow chart 600 illustrating a method for filtering device events according to embodiments. In some embodiments, the filter is designed to minimize overhead for the most common case, and can test at three levels of granularity, the service level, method level, and application level.

At block 602, the method receives an application event. In some embodiments, the event is a Binder transaction between an application and a service (or a service and another service). In alternative embodiments, the event can be an XPC transaction between an application and a service.

At block 604, the filter 310 determines if the service is hooked (i.e., the features of the service are being observed). In some embodiments, this can be done in one pointer comparison to determine if a hook table/feature list has been loaded. The service-level filter rule at block 604 checks to see if the recipient of the binder call matches a service in the loaded model 110. The determination of which services to hook is related to the choice of which features to hook. The choice of which features to hook is determined using the modeler 112. If the service is not hooked, the method proceeds to block 612 to process the transaction as usual. If the service is hooked, the method proceeds to block 606.

At block 606, the filter 310 determines if the method is hooked. In some embodiments, the method-level filter rule of block 606 checks to see if one of the functions matches a function in the loaded model 110. In some embodiments, a feature is uniquely identified from the corresponding service's "Binder interface" (also known as an AIDL file if automatically generated) with an opcode. These opcodes are defined before or during compilation of the "Binder interface." Since the opcode and the service pair uniquely identifies the feature, the opcode and service pair can be used to determine if a method is hooked. If the method is not hooked, the method proceeds to block 612 to process the transaction as usual. If the method is hooked, the method proceeds to block 608.

At block 608, the filter 310 determines if the application is being evaluated. In some embodiments, the application-level filter rule at block 608 checks a whitelist of applications known to be benign. The whitelist can be maintained by binder driver 218. Alternatively, the filter rule can check a list of applications to be analyzed. If the application is not being analyzed, the method proceeds to block 612 to process the transaction as usual. If the application is being analyzed, the method proceeds to block 610.

At block 610, event data regarding the transaction can be sent to the observer engine 106 (FIG. 1).

The method then proceeds to block 612 to process the transaction as usual, and the method ends.

As can be appreciated from the above, the amount of overhead required to process the binder call depends on the depth of filter process. For binder calls which reach the application-level logic, the cost in machine cycles is relatively high. In the same manner, binder calls which reach only the service-level logic have a lower cost in machine cycles. The finest level of granularity, the application-level can be considered a relatively high-overhead transaction while the method-level and service-level require less overhead each respectively. The relative frequency of reaching each filter-level is weighted towards the service-level call in the flow chart of FIG. 6. Those of skill in the art having the benefit of the disclosure will appreciate that the order of checking can be adjusted in the case that it is determined that in a particular environment, the overhead and/or frequency associated with a level makes it desirable to perform the checks in a different order than the order shown in FIG. 6.

The inventors have determined that the service-level check is the common case, meaning that the likelihood of the filter logic passing the service-level check is a low probability event. For this reason, the service-level check can be most optimized. To optimize this, the service-level logic consists of a one-time load to obtain a reference to the hooks table for that service. Any subsequent calls require only a pointer comparison to determine if the hooks table is loaded. This inexpensive check prevents the more costly second-level and third-level filter checks from occurring.

The same overhead cost can be extrapolated for the method-level filter check. The method level check at block 606 can be accomplished in one load instruction and three comparisons in some embodiments.

The uncommon case, in which the application-level filter check at block 608 results in a positive match for the two coarser granularity checks and a negative match for finding the application in the whitelist, can be considered a high-overhead operation. The check at block 608 can be accomplished in approximately eighteen instructions in some embodiments. However, the machine-learning model 110 can be optimized to use both a small subset of total services and a small subset of all possible methods from those services. The checking can be further optimized by using a whitelist of applications.

In some embodiments, the total subset of features to be observed can be relatively small when compared to the total number of possible features. By way of example and not limitation, the number of features observed in particular embodiments may be in a range of 150-5000 out of approximately 50,000 total possible features. Those of skill in the art having the benefit of the disclosure will appreciate that the number of observed features and/or the number of possible features may vary in different embodiments, and may vary outside of the given range. By keeping the number of features relatively small when compared to the total number of features, the likelihood of the filter logic exceeding the application level is low because of the decision-tree probabilities for the negative match cases is expected to be low. For this reason, the filter design of some embodiments emphasizes a negative match at the service-level and minimizes the depth of filter checking. This can be done by minimizing the number of features hooked, minimizing the number of methods hooked, and optimizing the application whitelist.

As will be appreciated from the above, some embodiments can provide improvements in computer and mobile device functionality. For example, the behavior based system can result in improved detection of malware when compared to conventional systems that analyze code to look for code fragments that match known malware. Such conventional systems can be defeated by minor changes to the code that do not affect the malware's main purpose. Instead, the systems and methods described herein can analyze the actual behavior of the code rather than the code itself. This can result in improved detection of malware. Further, detection and removal of malware can result in improved functionality of the computer or mobile device.

Figure 7:
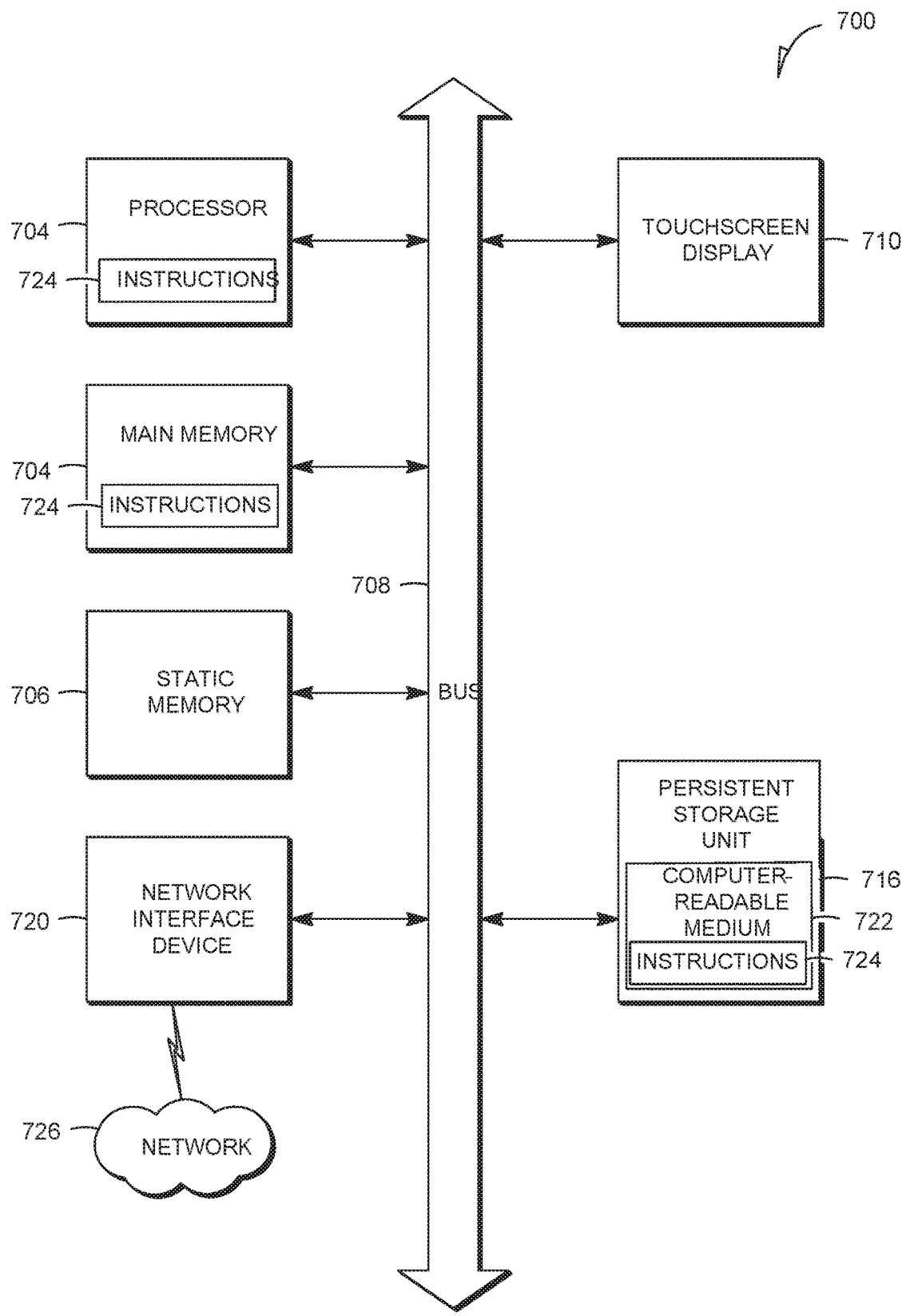
FIG. 7 is a block diagram of an example embodiment of a computer system upon which embodiments of the inventive subject matter can execute.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a touchscreen display unit 710. In example embodiments, the computer system 700 also includes a network interface device 720.

The persistent storage unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for observing device events, the method comprising:
    receiving a transaction request from a client application for an operating system service;
    determining whether the operating system service, a method associated with the transaction request, and the client application are being observed by determining whether the operating system service, a method associated with the transaction request, and the client application are being instrumented and whether they are under active evaluation;
    in response to determining that the operating system service, the method associated with the transaction request, and the client application are being observed, modifying a behavioral vector associated with the client application and processing the transaction request; and
    in response to determining that at least one of the operating system service, the method associated with the transaction request, and the client application are not being observed, processing the transaction request without modifying the behavioral vector associated with the client application.

2. The method of claim 1, further comprising:
    receiving a set of features to be observed, the set of features to be observed associated with one or more methods of one or more services;
    wherein determining whether the operating system service, the method associated with the transaction request, and the client application are being observed includes determining whether the method associated with the transaction request comprises one of the one or more methods of the one or more services.

3. The method of claim 2, wherein the transaction request is associated with a feature in the set of features to be observed, and wherein modifying the behavioral vector associated with the client application comprises setting a value in the behavioral vector to indicate that the method associated with the transaction request has been invoked.

4. The method of claim 1, further comprising determining, based at least in part on the behavioral vector associated with the client application, that the client application comprises malware.

5. The method of claim 4, wherein determining, based at least in part on the behavioral vector associated with the client application, that the client application comprises malware comprises correlating the behavioral vector associated with the client application with previously observed behavioral vectors associated with malware.

6. The method of claim 1, wherein at least one of the operating system service and the method associated with the transaction request are implemented in Android as a component of binder.

7. The method of claim 1, wherein at least one of the operating system service and the method associated with the transaction request are implemented in iOS as a component of XPC.

8. A non-transitory machine-readable storage medium having stored thereon computer-executable instructions for observing device events, the computer-executable instructions to cause one or more processors to perform operations comprising:
    receive a transaction request from a client application for an operating system service;
    determine whether the operating system service, a method associated with the transaction request, and the client application are being observed determining whether the operating system service, a method associated with the transaction request, and the client application are being instrumented and whether they are under active evaluation;
    in response to a determination that the operating system service, the method associated with the transaction request, and the client application are being observed, modify a behavioral vector associated with the client application and process the transaction request; and
    in response to a determination that at least one of the operating system service, the method associated with the transaction request, and the client application are not being observed, process the transaction request without modification of the behavioral vector associated with the client application.

9. The non-transitory machine-readable storage medium of claim 8, wherein the computer-executable instructions further comprise instructions to:
    receive a set of features to be observed, the set of features to be observed associated with one or more methods of one or more services;
    wherein the computer-executable instructions to determine whether the operating system service, the method associated with the transaction request, and the client application are being observed include instructions to determine whether the method associated with the transaction request comprises one of the one or more methods of the one or more services.

10. The non-transitory machine-readable storage medium of claim 9, wherein the transaction request is associated with a feature in the set of features to be observed, and wherein modifying the behavioral vector associated with the client application comprises setting a value in the behavioral vector to indicate that the method associated with the transaction request has been invoked.

11. The non-transitory machine-readable storage medium of claim 8, wherein the computer-executable instructions further comprise instructions to determine, based at least in part on the behavioral vector associated with the client application, that the client application comprises malware.

12. The non-transitory machine-readable storage medium of claim 11, wherein the computer-executable instructions to determine, based at least in part on the behavioral vector associated with the client application, that the client application comprises malware comprise instructions to correlate the behavioral vector associated with the client application with previously observed behavioral vectors associated with malware.

13. The non-transitory machine-readable storage medium of claim 8, wherein at least one of the operating system service and the method associated with the transaction request are implemented in Android as a component of binder.

14. A system for observing device events, the system comprising:
    one or more processors; and
    a non-transitory machine-readable medium having stored thereon computer-executable instructions to cause the one or more processors to:
    receive a transaction request from a client application for an operating system service, determine whether the operating system service, a method associated with the transaction request, and the client application are being observed by determining if the operating system service, a method associated with the transaction request, and the client application are being instrumented and if they are under active evaluation, in response to a determination that the operating system service, the method associated with the transaction request, and the client application are being observed, modify a behavioral vector associated with the client application and process the transaction request, and in response to a determination that at least one of the operating system service, the method associated with the transaction request, and the client application are not being observed, process the transaction request without modification of the behavioral vector associated with the client application.

15. The system of claim 14, wherein the computer-executable instructions further comprise instructions to:
    receive a set of features to be observed, the set of features to be observed associated with one or more methods of one or more services;
    wherein the computer-executable instructions to determine whether the operating system service, the method associated with the transaction request, and the client application are being observed include instructions to determine whether the method associated with the transaction request comprises one of the one or more methods of the one or more services.

16. The system of claim 15, wherein the transaction request is associated with a feature in the set of features to be observed, and wherein modifying the behavioral vector associated with the client application comprises setting a value in the behavioral vector to indicate that the method associated with the transaction request has been invoked.

17. The system of claim 14, wherein the computer-executable instructions further comprise instructions to determine, based at least in part on the behavioral vector associated with the client application, that the client application comprises malware.

18. The system of claim 17, wherein the computer-executable instructions to determine, based at least in part on the behavioral vector associated with the client application, that the client application comprises malware comprise instructions to correlate the behavioral vector associated with the client application with previously observed behavioral vectors associated with malware.

19. The system of claim 14, wherein at least one of the operating system service and the method associated with the transaction request are implemented in Android as a component of binder.

20. The system of claim 14, wherein at least one of the operating system service and the method associated with the transaction request are implemented in iOS as a component of XPC.

\* \* \* \* \*